United States Patent Office 3,216,890
Patented Nov. 9, 1965

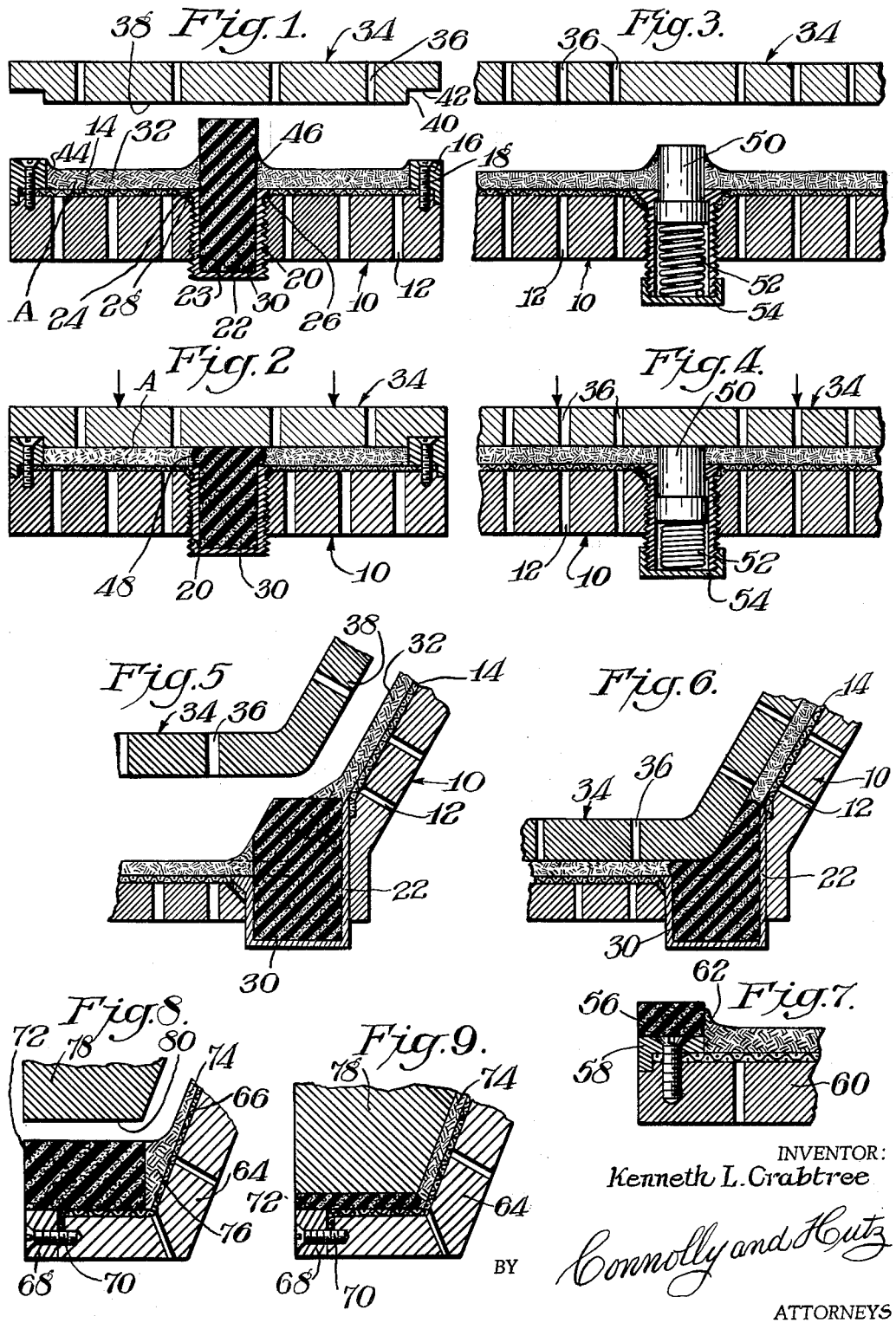

3,216,890
APPARATUS AND METHOD FOR MOLDING
PULP ARTICLES
Kenneth L. Crabtree, Fairfield, Maine, assignor to Keyes
Fibre Company, Portland, Maine, a corporation of
Maine
Filed Feb. 26, 1963, Ser. No. 261,176
7 Claims. (Cl. 162—227)

The present invention relates to a method and apparatus for molding pulp articles having well defined edge surfaces formed across the thickness thereof. Examples of such edge surfaces include those of apertures formed in either the bottom, top or side walls of the molded article, edge surfaces of slots extending across the surfaces of two intersecting walls and edge surfaces about the periphery of the molded article.

As is known, molded pulp articles are generally formed by immersing a suction mold, such as illustrated in U.S. Patent No. 2,585,049, into a slurry of pulp fibers while suction is being applied in order to form a pulp layer in the shape of the desired article on the molding surface of the suction mold. The suction mold is then withdrawn from the slurry and suction is generally continued to compact the deposited fibers on the surface while exhausting residual slurry liquid. Thereafter the molded article may be subjected to a number of treatments. For example, it may be stripped from the suction mold and dried in an oven or other heating means; it may be dried in place on the suction mold by the application of a heated mating die which simultaneously presses the article; it may be pressed in place on the suction die by a mating pressing die for the purpose of further compacting the fibers and expressing additional slurry liquid content and then dried by any one of a variety of methods; it may be transferred without the application of substantial pressure to a mating transfer die by means generally involving suction against the article through ports in the transfer die and the simultaneous application of air or other gas pressure through the suction ports of the suction mold and then subsequently dried, etc. Examples of the foregoing procedures including apparatus suitable for carrying out the same are illustrated by U.S. Patent Nos. 1,804,203, 2,163,585, 2,746,358 and 2,752,830.

Edge surfaces have been formed in molded pulp articles in the past by a variety of methods. For example, these have been punched, cut or otherwise formed after molding and drying the article. Another method has included the use of a fixed stud or other formation-preventing projection extending beyond the forming surface of the suction mold a distance substantially greater than the thickness of the layer of pulp fibers normally deposited on the forming surface during molding. Such a projection accumulates pulp about its periphery which is of a thickness greater than the normal molding thickness of the remainder of the article. As a consequence, the formed edge surface is not only of greater than normally desired thickness but is also feathered on the rough molded side of the molded article, i.e., the side opposite to that produced on the forming surface of the mold. Removal of the resulting article as such is difficult because of excess friction about the projection surface which tends to tear or otherwise distort the wet formed article. In order to avoid this difficulty, and to provide a side edge free of feathering, the prior art has utilized a mating male transfer or pressing die which has a female recess in its surface to receive the projection and thereby permit compaction of the fibers immediately adjacent its periphery. Such an arrangement permits the molding of a satisfactory article but has not otherwise proven entirely satisfactory for a number of reasons. Thus, the forming die and mating transfer or pressing die must be carefully machined in order to be effective and this is an expensive operation. Additionally, it has been found that such die structure wears rapidly in spite of all reasonable precautions to maintain alignment of the mating dies. The excessive clearance resulting from this wear, results in the formation of knife-like projections around the periphery of the formed hole. Holes of the type in question are often employed as ventilating means in the bottom or side walls of containers designed for packaging berries or other soft-surfaced articles. Thus, and in addition to loss of storage space and physical damage to packaged articles, these knife-like projections may actually be responsible for premature spoilage of the packaged contents.

Apertures have also been produced by minimizing pulp deposit over a desired aperture area by the use of a formation-preventing plug and then removing the pulp within the desired aperture area by the use of a blast of high pressure gas or a cutting tool directed about the periphery of the desired aperture while the article is on the forming surface in the wet condition. Because this method inherently results in withdrawal of interfelted fibers extending from the peripheral pulp area into the area of pulp removal, the resulting aperture is generally surrounded by a weakened pulp area, i.e., an area of relatively low pulp density. Additionally, the mechanism for carrying out this method is relatively complicated and hence not only initially expensive but also a maintenance problem.

A principal object of the present invention is to provide an apparatus and process for forming molded pulp articles having clearly defined edge surface of desired thickness and of relatively high pulp density.

A further object of the present invention is to provide a method and apparatus as aforesaid which is relatively simple in construction and free of maintenance, alignment and other problems inherent in the prior art.

These and other objects will become more apparent upon considering the following description and drawings wherein:

FIG. 1 is a cross-sectional view of an aperture forming embodiment of the present invention, the suction mold and compression member being shown out of mating relation;

FIG. 2 is a cross-sectional view of the embodiment of FIG. 1, the suction mold and compression member being shown in mating relation;

FIG. 3 is a fragmentary cross-sectional view of another aperture forming embodiment of the present invention, the suction mold and compression member being shown out of mating relation;

FIG. 4 is a fragmentary cross-sectional view of the embodiment of FIG. 3, the suction mold and compression member being shown in mating relation;

FIG. 5 is a fragmentary cross-sectional view of a slot forming embodiment of the present invention, the suction mold and compression member being shown out of mating relation;

FIG. 6 is a fragmentary cross-sectional view of the embodiment of Fig. 5, the mold and compressing member being shown in mating relation;

FIG. 7 is a fragmentary cross-sectional view of the suction mold portion of a marginal edge forming embodiment of the present invention;

FIG. 8 is a fragmentary cross-sectional view of another marginal edge forming embodiment of the present invention, the suction mold and compression member being shown out of mating relation; and FIG. 9 is a fragmentary cross-sectional view of the embodiment of FIG. 8, the suction mold and compression member being shown in mating relation.

The present invention is based on the discovery that it is possible to form well defined edge surfaces across the thickness of a molded pulp article by the use of a suction mold having a forming surface shaped to produce the desired article by suction deposition and a yieldably supported upstanding formation-preventing member protruding beyond the forming surface of the mold a distance substantially greater than the thickness of the layer of pulp fibers normally deposited on the forming surface. This upstanding member is shaped to conform at least substantially to the shape of the desired edge surface and, by virtue of the material of construction and/or the means employed for supporting the same, may be depressed after suction deposition of pulp fibers in a direction toward the forming surface so as to present an overall height corresponding substantially to the thickness of the desired edge surface. During the course of depressing the aforesaid member, means are also provided for compaction of the suction deposited fibers adjacent to the edge surface of the upstanding member. As a consequence of this arrangement, the present invention is not only capable of producing a clearly defined edge surface across the thickness of molded pulp article but also eliminates feathering at such edge and obtains an adjacent pulp area of relatively high pulp density which contributes to improved article strength at the edge surface of the article. Additionally, the simplicity of applicant's apparatus eliminates initial cost and maintenance problems inherent in previously used methods and apparatus.

With particular reference to FIGS. 1 and 2, suction mold 10 includes suction ports 12 and a forming surface 14 communicating with the suction ports. As shown, the forming surface comprises a separate foraminous member or wire screen secured to suction mold 10 in a well-known manner by the use of a ring member 16 fastened to suction mold 10 by bolts 18. For the sake of simplifying the present description, the article to be molded on the suction mold is shown as a rectangular sheet A of pulp of predetermined thickness and the improved edge surface to be formed therein comprises the edge of a circular aperture located at the center of the sheet. However, the same method and apparatus would be equally applicable to more complicated articles such as egg trays and to various shapes and locations of apertures.

Mold 10 includes a centrally positioned threaded opening 20 within the body thereof for the purpose of receiving a cylindrical supporting member 22 which, as shown, is closed at the bottom and has complementary threading on its cylindrical surface, the upper peripheral end of member 22 being outwardly flared at 24 and received by a corresponding countersink 26 in the upper surface of the mold 10. It will be understood that bottom closure means 23 of member 22 may include drainage or other openings so long as these do not interfere with the supporting function of this member. The peripheral edge 28 of an opening within the center of foraminous member 14 is secured to the upper surface of suction mold 10 by virtue of the wedging action of elements 24 and 26 when the member 22 is threaded downwardly into bore 20. The inner diameter of the member 22 is preferably designed to correspond substantially to the diameter of the desired aperture in the molded pulp article.

An upstanding member 30 is positioned within supporting means 22 and protrudes beyond the forming surface 14 a distance substantially greater than the thickness of the layer of pulp fibers 32 normally deposited on the forming surface 14 by suction deposition. Member 30 is a formation-preventing member which is shaped to conform at least substantially to the desired edge surface of the aperture to be formed in the article. In the particular embodiment shown, this member is cylindrical in shape and of a resilient compressible material such as sponge rubber or one of the synthetic elastomers. A particularly satisfactory material for member 30 is the commercially available closed cell neoprene cord as manufactured by the Rubatex Division of Great American Industries, Inc. The selected resilient compressible material provides a yieldably supported upstanding formation-preventing member which, as will be shown hereinafter, serves as an edge surface forming member to obtain a well defined edge surface having a pulp density adjacent thereto greater than the density of the pulp as initially deposited by suction.

With continued reference to Figs. 1 and 2, compression member 34 which may take the form of a mating, heating, pressing or transfer die includes ports 36 and has a shape on the mating surface 38 thereof corresponding, at least in the mating area adjacent the upstanding member 30, substantially to the shape of the desired article. As shown, this member also includes a peripheral recess defined by surfaces 40 and 42 which cooperates with the inner vertical and top surfaces of ring 16 in a manner well understood by those in the art. However, the particular arrangements of elements 16, 40 and 42 as shown in FIGS. 1 and 2 can, in accordance with the present invention, be replaced by another and preferred arrangement as discussed hereinafter in connection with FIG. 7.

The pulp layer 32 is deposited by suction deposition on forming surface 14 to a desired thickness and with a cross-sectional shape as shown in FIG. 1. It will be noted that a feathered edge pulp accumulation occurs at 44 about the periphery of the article and at 46 about the periphery of the upstanding member 30. In accordance with the present invention, compression member 34 is brought into mating relation with the fiber carrying forming surface 14 to assume a position such as shown in FIG. 2. During attainment of this relation, compression member 34 engages the upstanding member 30 and depresses the same to a predetermined height which corresponds substantially to the thickness of the desired edge surface about the periphery of the aperture in question. During depression of element 30 to such height, the fibers at the feather build up area 46 are compacted downwardly around the edge of the upstanding member by contact with the surface 38 of the compression member 34. It will be understood that the degree of compaction may be greater or less than that shown in FIG. 2, i.e., this depends upon the desired height of the finished aperture edge surface. As is known in the art, element 16 and surfaces 40 and 42 simultaneously cooperate to eliminate or reduce feathering at 44. In view of the resilient compressible material of member 30, there is an inherent tendency for the diameter thereof to increase slightly and form a bulge 48 as the height of member 30 is depressed by the compression member 34. This bulging action also serves to compact the fibers of the article at the edge surface of the aperture to obtain a well defined surface of a pulp density greater than that obtained during suction deposition. The use of solid rubber for members 30 results in greater sideways expansion than does the use of sponge rubber and will effect increased compactions.

After depressing element 30 by the movement of compression member 34 to obtain the desired aperture edge surface thickness, article 32 may be removed from suction mold 10 by conventional means, namely, the application of gas or air pressure upwardly through the ports 12 with the simultaneous application of suction by vacuum through the ports 36 of compression member 34. This results in the transfer of article A to compression member 34, and permits withdrawal of member 34 to its initial position as shown in FIG. 1, with the molded article A supported on the surface thereof. Although there is a minor bulging tendency of the member 30 as shown at 48 which serves the advantage of compaction of pulp fibers adjacent thereto, the extent thereof does not interfere with ready transfer of the article from suction mold 10 to compression member 34 and such transfer does not undesirably distort or otherwise deform the aperture surface edge. Either subsequent to transfer or prior to transfer of the article from the suction mold 10, the molded article is dried in the usual manner. With reference to drying the article on such mold 10 prior to transfer, it will be appreciated that this is possible without altering the character of the resilient compressible material of which member 30 is formed by virtue of the fact that there are many such materials such as the silicone rubber compounds which will withstand temperatures greater than the cellulose fibers of the molded article itself.

Although the embodiment of FIGS. 1 and 2 does not illustrate the presence of a female recess within compression member 34 and this is not a preferred arrangement for reasons alluded to above, it will be understood that such is a permissive arrangement so long as the extent thereof permits actual depression of the height of member 30 upon obtaining the mating relation between suction mold 10 and compression member 34.

With reference to the embodiment of FIGS. 3 and 4, like reference numerals indicate corresponding elements of the embodiments of FIGS. 1 and 2. The embodiment of FIGS. 3 and 4 includes an upstanding formation-preventing member 50 of metal or other non-resilient material. It is yieldably supported in supporting means 22 by the use of a compression spring member 52 or an equivalent means. Cap 54 forming the bottom of supporting means 22, permits replacement of spring member 52 and/or adjustment of the height of element 50 and hence the compression forces required to overcome spring 52 when depressing element 50 with compression element 34. The operation of the embodiment of FIGS. 3 and 4 will be apparent upon considering the description of the operation of FIGS. 1 and 2 above.

The embodiment of FIGS. 5 and 6 is substantially identical to that of FIGS. 1 and 2, like reference numerals indicating corresponding arrangements of the latter embodiment. This embodiment illustrates apparatus of the present invention suitable for rectangular slot formation across the surfaces of two intersecting molded pulp walls. A press fit of supporting member 22 in mold 10 is employed in this embodiment. Typical uses of such slots are shown in U.S. Patent No. 2,814,427. It will be appreciated that such slot formation can also be accomplished by the use of an arrangement comparable in its specific details to those of the embodiment of FIGS. 3 and 4.

The embodiment of FIG. 7 illustrates a preferred method and apparatus of the present invention for forming an edge surface about the periphery of a molded article such as formed in the embodiment of FIGS. 1 and 2. In this embodiment, ring 56 of resilient compressible material such as employed for element 30 in the embodiment of FIGS. 1 and 2, replaces the forming ring 16 of the latter embodiment. Ring 56 is conveniently fastened by an adhesive or other means to forming wire retaining element 58. It will be appreciated that element 58 must be of a height substantially less than the desired thickness of the pulp article to be formed on forming mold 60. Suction deposition of pulp fibers on mold 60 results in feathered edge pulp accumulation at 62. Upon engagement of ring 56 with a mating compression member (not shown) which may be a flat surfaced or unstepped element like 34 of the embodiment of FIGS. 1 and 2, the fibers of feathered edge 62 are compacted downwardly around the inner edge of ring 56 to form an article edge free of feathering and of increased pulp density, i.e., the compaction operation of the embodiment is entirely comparable with FIGS. 1 and 2 and 5 and 6 respectively.

The embodiment of FIGS. 8 and 9 illustrates a preferred method and apparatus of the present invention for forming an unfeathered edged surface about the periphery of a dish-shaped molded article. This is a particularly advantageous arrangement when it is desired to mold a plain edge or rimless article on a male forming die 64. As shown, this embodiment includes a forming wire 66 peripherally fastened on die 64 by retaining means 68 and 70. Ring 72 of resilient compressible material of the type previously described, is fastened about the periphery of mold 64 to define the edge surface of the article 74. On suction deposition of pulp fibers to produce the article 74, a thickened pulp area 76 is obtained in the narrow area between the inner vertical wall of ring 72 and the adjacent forming surface of the male die 64. Upon compression force application by member 78 resulting in depression of element 72, the pulp fibers at 76 are compacted to obtain a substantially rimless article of increased pulp density. If a conventional rigid ring and cooperating compression member such as shown in the embodiment of FIGS. 1 and 2 were employed in lieu of ring 72 and member 78, the conventional male projection on the compressing member or pressing die would necessarily have an extremely thin wall and a sharp pointed edge in order to wipe the pulp away from the ring and compact it against the side wall of the forming die 74. This sharp thin edge continually engaging the female fit of the ring is subjected to forces which rapidly wear and even bend or break the same. As a consequence, poorly formed article edges are obtained. On the other hand, the use of the flexible ring as shown in the embodiment of FIGS. 8 and 9, permits the use of a stable wide edge 80 on the pressing or compression member 78 without encountering the aforesaid difficulties.

It will be appreciated that the foregoing description of the present invention is for the purpose of illustration only, the scope thereof being set forth in the appended claims.

What is claimed is:

1. Apparatus for forming molded pulp articles comprising a suction mold having a forming surface contoured to produce the desired articles by suction deposition of a layer of pulp fibers thereon, an upstanding formation preventing member secured to the forming surface to protrude therefrom to a height substantially greater than the thickness of the layer of pulp fibers normally deposited on the forming surface, the member being shaped to conform generally to the shape of an edge surface to be formed across the thickness of the layer, the member being of yieldable material which may be depressed toward the forming surface to a height corresponding to the thickness of the layer at the desired edge surface with a resultant change in shape to conform closely to the shape of the edge surface to be formed across the thickness of the molded articles.

2. Apparatus for forming molded pulp articles as in claim 1 wherein the formation preventing member is shaped to form a margin bounding the layer of pulp fibers.

3. Apparatus for forming molded pulp articles as in claim 1 wherein the formation preventing member is shaped to form an aperture through the layer of pulp fibers.

4. Apparatus for forming molded pulp articles as in claim 1 wherein the forming surface of the suction mold comprises a separate foraminous member connected with the suction mold and securing means for the upstanding member in the suction mold arranged to connect the foraminous member with the suction mold adjacent the upstanding member.

5. The method of forming molded pulp articles which comprises the steps of suction depositing a layer of pulp fibers on a forming surface contoured to produce the desired article while selectively preventing deposition of pulp fibers in a predetermined zone to establish generally the shape of an edge surface to be formed across the layer, and compressing the pulp fibers against the forming surface at least in an area adjacent the predetermined zone while also compressing the pulp fibers which establish the edge surface in a direction away from the predetermined zone to closely define the shape of the edge surface across the article.

6. The method of forming molded pulp articles as in claim 5 wherein the predetermined zone establishes a margin bounding the layer of pulp fibers.

7. The method of forming molded pulp articles as in claim 5 wherein the predetermined zone establishes an aperture through the layer of pulp fibers.

References Cited by the Examiner
UNITED STATES PATENTS

| 1,983,553 | 12/34 | Manson | 162—396 |
| 3,016,090 | 1/62 | Chaplin | 162—392 |

DONALL H. SYLVESTER, *Primary Examiner.*

MORRIS O. WOLK, *Examiner.*